(12) United States Patent
Barger

(10) Patent No.: US 9,740,228 B2
(45) Date of Patent: Aug. 22, 2017

(54) SYSTEM, METHOD AND COMPUTER PROGRAM PRODUCT FOR ENERGY ALLOCATION

(71) Applicant: Perfectly Green Corporation, McKinney, TX (US)

(72) Inventor: Eric Barger, Prosper, TX (US)

(73) Assignee: Perfectly Green Corporation, Plano, TX (US)

( * ) Notice: Subject to any disclaimer, the term of this patent is extended or adjusted under 35 U.S.C. 154(b) by 0 days.

(21) Appl. No.: 15/168,076

(22) Filed: May 29, 2016

(65) Prior Publication Data
US 2016/0352143 A1 Dec. 1, 2016

Related U.S. Application Data

(60) Provisional application No. 62/168,385, filed on May 29, 2015.

(51) Int. Cl.
| G06F 19/00 | (2011.01) |
| G05F 1/66 | (2006.01) |
| F25B 27/00 | (2006.01) |
| F24F 11/00 | (2006.01) |
| H02J 5/00 | (2016.01) |

(52) U.S. Cl.
CPC ............ G05F 1/66 (2013.01); F24F 11/0009 (2013.01); F25B 27/00 (2013.01); F25B 2600/021 (2013.01); H02J 5/00 (2013.01)

(58) Field of Classification Search
CPC .. Y02T 10/7241; F25B 2600/021; G05F 1/66; F24F 11/0009; H02J 5/00
See application file for complete search history.

(56) References Cited

U.S. PATENT DOCUMENTS

| 4,042,017 A | 8/1977 | Dench et al. |
| 4,173,125 A | 11/1979 | Bradshaw |
| 4,226,089 A | 10/1980 | Barrow |
| 5,821,658 A * | 10/1998 | Boggs, III ........... H01R 39/646 310/103 |
| 6,453,678 B1 * | 9/2002 | Sundhar ................. B60H 1/005 62/235.1 |
| 6,880,535 B2 | 4/2005 | Sorter et al. |
| 7,191,736 B2 | 3/2007 | Goldman |
| 7,469,540 B1 | 12/2008 | Knapton et al. |
| 7,507,869 B2 | 3/2009 | Cisneros |

(Continued)

FOREIGN PATENT DOCUMENTS

| EP | 0970613 | 1/2000 |
| KR | 1020020023699 | 3/2002 |

OTHER PUBLICATIONS

International Search Report and Written Opinion; PCT Application No. PCT/US2016/034907; Sep. 19, 2016.

(Continued)

*Primary Examiner* — Michael D Masinick
(74) *Attorney, Agent, or Firm* — James L. Baudino

(57) ABSTRACT

An energy allocation system includes an air conditioning unit with a VDC compressor and a fan configured for variable speed output. The air conditioning unit further includes a built-in power generator. A blending module is configured to split the generator-produced power into AC and DC allocations and combine the DC power allocation with DC power received from a DC energy device.

11 Claims, 14 Drawing Sheets

(56) References Cited

U.S. PATENT DOCUMENTS

| | | | |
|---|---|---|---|
| 7,638,314 B2 | 12/2009 | Zappi et al. | |
| 7,666,666 B2 | 2/2010 | Chou | |
| 7,771,699 B2 | 8/2010 | Adams et al. | |
| 7,819,930 B2 | 10/2010 | Adams et al. | |
| 8,061,132 B2 | 11/2011 | Fong et al. | |
| 8,065,874 B2 | 11/2011 | Fong et al. | |
| 8,128,728 B2 | 3/2012 | Tsangaris et al. | |
| 8,142,650 B2 | 3/2012 | Moniwa et al. | |
| 8,191,360 B2 | 6/2012 | Fong et al. | |
| 8,191,361 B2 | 6/2012 | Fong et al. | |
| 8,196,395 B2 | 6/2012 | Fong et al. | |
| 8,201,402 B2 | 6/2012 | Fong et al. | |
| 8,215,105 B2 | 7/2012 | Fong et al. | |
| 8,240,142 B2 | 8/2012 | Fong et al. | |
| 8,301,359 B1 | 10/2012 | Sagar et al. | |
| 8,304,566 B2 | 11/2012 | Cantizani | |
| 8,366,794 B2 | 2/2013 | Tremblay et al. | |
| 8,372,169 B2 | 2/2013 | Tsangaris et al. | |
| 8,387,374 B2 | 3/2013 | Fong et al. | |
| 8,393,148 B2 | 3/2013 | Fong et al. | |
| 8,436,489 B2 | 5/2013 | Stahlkopf et al. | |
| 8,450,884 B2 | 5/2013 | Stahlkopf et al. | |
| 8,468,814 B2 | 6/2013 | Fong et al. | |
| 8,482,152 B1 | 7/2013 | Stahlkopf et al. | |
| 8,497,389 B2 | 7/2013 | Pottathil | |
| 8,516,809 B2 | 8/2013 | Fong et al. | |
| 8,561,399 B2 | 10/2013 | Fong et al. | |
| 8,583,350 B1 | 11/2013 | Sagar et al. | |
| 8,603,198 B2 | 12/2013 | Gordon et al. | |
| 8,690,975 B2 | 4/2014 | Tsangaris et al. | |
| 8,756,928 B2 | 6/2014 | Fong et al. | |
| 8,769,943 B2 | 7/2014 | Fong et al. | |
| 8,844,277 B2 | 9/2014 | Fong et al. | |
| 8,950,199 B2 * | 2/2015 | Barger | C11B 13/00 62/79 |
| 2002/0026797 A1 * | 3/2002 | Sundhar | B60H 1/00478 62/3.2 |
| 2002/0117992 A1 * | 8/2002 | Hirono | H02P 23/28 318/801 |
| 2003/0232107 A1 | 12/2003 | Terry et al. | |
| 2004/0144338 A1 | 7/2004 | Goldman | |
| 2004/0173192 A1 | 9/2004 | Sorter et al. | |
| 2004/0200221 A1 | 10/2004 | Sorter et al. | |
| 2005/0143865 A1 | 6/2005 | Gardner | |
| 2005/0260138 A1 | 11/2005 | Flanigan et al. | |
| 2006/0063242 A1 | 3/2006 | Chou | |
| 2007/0098625 A1 | 5/2007 | Adams et al. | |
| 2007/0214712 A1 | 9/2007 | Garwood | |
| 2007/0266632 A1 | 11/2007 | Tsangaris et al. | |
| 2008/0000436 A1 | 1/2008 | Goldman | |
| 2008/0011007 A1 * | 1/2008 | Larson | B60H 1/00428 62/323.2 |
| 2008/0050800 A1 | 2/2008 | McKeeman et al. | |
| 2008/0078194 A1 | 4/2008 | Lin et al. | |
| 2008/0107591 A1 | 5/2008 | Cisneros | |
| 2008/0109100 A1 | 5/2008 | Macharia et al. | |
| 2008/0257163 A1 | 10/2008 | Kobayashi et al. | |
| 2008/0264080 A1 * | 10/2008 | Creed | F25B 49/025 62/132 |
| 2009/0005582 A1 | 1/2009 | Anderson | |
| 2009/0029197 A1 | 1/2009 | Hibino et al. | |
| 2009/0242652 A1 * | 10/2009 | Hong | B60H 1/3211 236/46 R |
| 2009/0298935 A1 | 12/2009 | Flanigan et al. | |
| 2010/0037513 A1 | 2/2010 | Petrucci et al. | |
| 2010/0045105 A1 * | 2/2010 | Bovio | B60H 1/00428 307/9.1 |
| 2010/0059444 A1 | 3/2010 | Moniwa et al. | |
| 2010/0082160 A1 * | 4/2010 | Kondou | F25B 49/025 700/275 |
| 2010/0173399 A1 | 7/2010 | Chou | |
| 2010/0326075 A1 | 12/2010 | Fong et al. | |
| 2010/0329903 A1 | 12/2010 | Fong et al. | |
| 2011/0023488 A1 | 2/2011 | Fong et al. | |
| 2011/0023977 A1 | 2/2011 | Fong et al. | |
| 2011/0030359 A1 | 2/2011 | Fong et al. | |
| 2011/0030552 A1 | 2/2011 | Fong et al. | |
| 2011/0115223 A1 | 5/2011 | Stahlkopf et al. | |
| 2011/0232867 A1 * | 9/2011 | Barger | C11B 13/00 165/104.11 |
| 2011/0245523 A1 | 10/2011 | Pottathil | |
| 2011/0274615 A1 | 11/2011 | Ishikawa | |
| 2011/0314800 A1 | 12/2011 | Fong et al. | |
| 2012/0019009 A1 | 1/2012 | Fong et al. | |
| 2012/0067036 A1 | 3/2012 | Fong et al. | |
| 2012/0085107 A1 | 4/2012 | Allen et al. | |
| 2012/0090314 A1 | 4/2012 | Fong et al. | |
| 2012/0255292 A1 | 10/2012 | Fong et al. | |
| 2012/0286052 A1 | 11/2012 | Atluri et al. | |
| 2012/0286522 A1 | 11/2012 | Stahlkopf et al. | |
| 2012/0291989 A1 | 11/2012 | Fong et al. | |
| 2012/0297752 A1 | 11/2012 | Neels | |
| 2012/0312503 A1 | 12/2012 | Arrieta | |
| 2012/0324924 A1 | 12/2012 | Barbizet | |
| 2013/0041516 A1 * | 2/2013 | Rockenfeller | H02J 3/38 700/287 |
| 2013/0047597 A1 | 2/2013 | Fong et al. | |
| 2013/0104533 A1 | 5/2013 | Fong et al. | |
| 2013/0108480 A1 | 5/2013 | Fong et al. | |
| 2013/0111895 A1 | 5/2013 | Fong et al. | |
| 2013/0145783 A1 * | 6/2013 | Hong | B60H 1/3211 62/119 |
| 2013/0168961 A1 | 7/2013 | Stahlkopf et al. | |
| 2013/0291529 A1 | 11/2013 | Stahlkopf et al. | |
| 2013/0333373 A1 | 12/2013 | Fong et al. | |
| 2014/0026549 A1 | 1/2014 | Fong et al. | |
| 2014/0119997 A1 | 5/2014 | Shulenberger et al. | |
| 2014/0182318 A1 * | 7/2014 | Eom | F25B 49/02 62/129 |
| 2015/0152810 A1 * | 6/2015 | Barger | C11B 13/00 60/685 |
| 2015/0192346 A1 * | 7/2015 | Lee | F25D 21/006 62/129 |
| 2015/0369525 A1 * | 12/2015 | Hsieh | H02M 3/155 62/235.1 |
| 2016/0141878 A1 * | 5/2016 | Johansen | F25B 27/002 307/20 |
| 2016/0141879 A1 * | 5/2016 | Motsenbocker | G05F 1/67 307/18 |
| 2016/0352143 A1 * | 12/2016 | Barger | F25B 31/026 |

OTHER PUBLICATIONS

International Search Report and Written Opinion; International application No. PCT/US2011/030006; Nov. 21, 2011.

* cited by examiner

SYSTEM, METHOD AND COMPUTER PROGRAM PRODUCT FOR ENERGY ALLOCATION

BACKGROUND

As energy prices continue to climb, conservation of energy resources becomes increasingly important. For example, resources such as waste vegetable oil produced by food processing facilities may be recycled and utilized for additional purposes. Further, use of renewable energy sources is sometimes desired to reduce reliance on non-renewable energy sources, such as solar or wind-based energy sources. However, many potential energy sources remain unutilized or under-utilized.

BRIEF SUMMARY

The system and process are configured with a base function of producing air conditioning and generating power both together and separately. The generator provides backup power during power outages as well as supplemental power throughout the day. A Blending module can split the generator head loads into AC and DC power allocations simultaneously, monitor rapid DC current fluctuations and compensate blending of solar and generator power. The system produces generator power combined with photovoltaic or wind DC power to sustain the continuous operation of AC power for both on and off grid consumption. A predictive algorithm is used to standby KW pricing for utilities real time market value. The system produces generator and blended power for the home/business electrical needs during local power outage, heavy loads or time pricing. The system produces generator and photovoltaic power for home's/business' real-time needs while supplying excess generator/photovoltaic power to the electrical utility grid.

In order to produce finite BTU (British Thermal Unit) attenuation, the air conditioning system comprises a multi-speed condenser and fan setting controlled by preprogrammed software. This functionality lowers the system's overall power consumption by changing the condenser and fan's speed and frequency.

The blended functionality air conditioning system connects through a blending module which ties to the electric utility grid. This configuration enables the generator, along with photovoltaic string(s) the ability to sell power to the electric utility grid.

Programming code comprises instructions based on input sensors data, output commands, algorithms which in-turn respond to but not limited to sensors, environment variables allowing the fluctuation of output processes through a real-time and/or hysteresis based algorithm, logic, binary, compiled or precompiled language. The communication protocol for the blended functionality air conditioning system provides communication through wired or wireless (IEEE 802.xx) protocols. This enables both home owner/occupant and electric utility company the ability to remotely operate and control the systems components.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
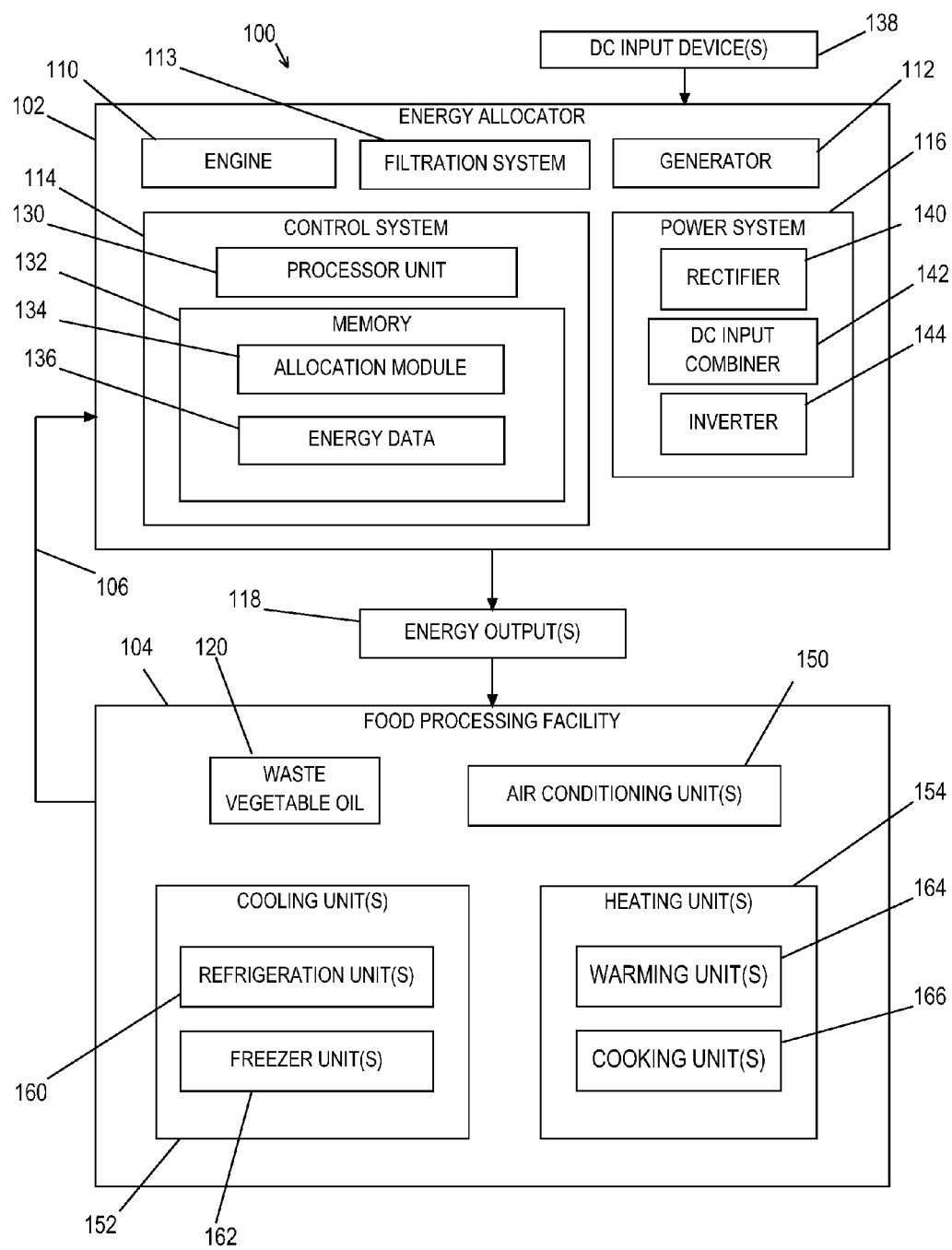
FIG. 1 is a diagram illustrating an embodiment of an energy allocation system in accordance with the present disclosure.

Embodiments of the present disclosure provide a method, system and computer program product for energy allocation utilizing waste energy resources. For example, in some embodiments, for a food processing facility, an on-site energy allocation method comprises: filtering waste vegetable oil generated from an on-site food processing facility; operating an on-site engine with the filtered vegetable oil to drive a generator, the generator providing an alternating current (AC) power supply; and forming an elevated temperature fluid stream and a low-temperature fluid stream using exhaust heat generated by the engine, the elevated temperature fluid stream and the low-temperature fluid stream usable by the food processing facility. Embodiments of the present disclosure utilize waste energy resources generated by a particular facility and process and/or re-allocate such resources as a source of energy usable by the particular facility.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples of the computer readable storage medium may include a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the Figures and in particular with reference to FIG. 1, an illustrative embodiment of a system 100 for energy allocation is provided. In the embodiment illustrated in FIG. 1, system 100 includes an energy allocator 102 for converting waste resources and/or waste energy to a source of energy and allocating the produced energy to a desired use. For example, in the embodiment illustrated in FIG. 1, allocator 102 is used as an on-site allocator 102 for a food processing facility 104. However, it should be understood that allocator 102 may be used in connection with other types of facilities or resources. In some embodiments, various components of allocator 102 are provided as a modular unit to facilitate on-site location of the modular allocator 102 unit on and/or substantially near the premises of facility 104. As will be described in further detail below, allocator 102 utilizes waste resources and/or waste energy, referred to generally by reference numeral 106, generated by facility 102 to generate a power supply and/or provide a resource usable as an energy source or energy output(s) 118, which may be used by facility 102 and/or various components of system 100.

In the embodiment illustrated in FIG. 1, allocator 102 includes an engine 110, a generator 112, a filtration system 113, a control system 114 and a power system 116. Engine 110 is configured to operate on a variety of types of fuels. In some embodiments, engine 110 comprises a diesel engine and is operated using waste vegetable oil 120 generated and/or produced by facility 104. For example, facility 104 may process various foods utilizing vegetable oil such that various amounts of waste vegetable oil 120 are produced. Embodiments of the present disclosure utilize the waste vegetable oil 120 produced by facility 104 for fueling and/or otherwise operating engine 110. In some embodiments, filtration system 113 is used as an on-site filter for filtering and/or otherwise cleaning waste vegetable oil 120 produced by facility 104. Engine 110 is coupled to and drives generator 112 to provide an alternating current (AC) output power supply. The AC power supply provided by generator 112 may be utilized by various components of system 100 and/or by facility 104.

In FIG. 1, control system 114 includes a processor unit 130 and a memory 132. Control system 114 may also include a bus or communications fabric which provides communications between processor unit 130 and memory 132 and/or other devices such as, but not limited to, persistent storage, communications units, input/output (I/O) units, and a display. Processor unit 130 serves to execute instructions for software that may be loaded into memory 132. Processor unit 130 may be a set of one or more processors or may be a multi-processor core, depending on the particular implementation. Further, processor unit 130 may be implemented using one or more heterogeneous processor systems in which a main processor is present with secondary processors on a single chip. As another illustrative example, processor unit 130 may be a symmetric multi-processor system containing multiple processors of the same type.

In some embodiments, memory 132 may be a random access memory or any other suitable volatile or non-volatile storage device. A persistent storage device may also be included and may take various forms depending on the particular implementation. For example, persistent storage may be a hard drive, a flash memory, a rewritable optical disk, a rewritable magnetic tape, or some combination of the above. The media used by persistent storage also may be removable such as, but not limited to, a removable hard drive. Control system 114 may also include communications units for communicating with other data processing systems or devices such as, but not limited to, a network interface card. Modems, cable modem and Ethernet cards are just a few of the currently available types of network interface adapters. Communications may be enabled using either or both physical and wireless communications links. Input/output units enable input and output of data with other devices that may be connected to control system 114 such as, but not limited to, a connection for user input through a keyboard and mouse, output to a printer, or a display for providing a mechanism to display information to a user.

Instructions for an operating system and applications or programs may be located in persistent storage and may be loaded into memory 132 for execution by processor unit 130. The processes of the different embodiments may be performed by processor unit 130 using computer implemented instructions, which may be located in a memory, such as memory 132. These instructions are referred to as program code, computer usable program code, or computer readable program code that may be read and executed by a processor in processor unit 130. The program code in the different embodiments may be embodied on different physical or tangible computer readable media, such as memory 132 or persistent storage.

Program code is located in a functional form on computer readable media that is selectively removable and may be loaded onto or transferred to control system 114 for execution by processor unit 130. Program code and computer readable media form a computer program product in these examples. In one example, computer readable media may be in a tangible form, such as, for example, an optical or magnetic disc that is inserted or placed into a drive or other device that is part of persistent storage for transfer onto a storage device, such as a hard drive that is part of persistent storage. In a tangible form, computer readable media also may take the form of a persistent storage, such as a hard drive, a thumb drive, or a flash memory that is connected to control system 114. The tangible form of computer readable media is also referred to as computer recordable storage media. In some instances, computer readable media may not be removable. Alternatively, program code may be transferred to control system 114 from computer readable media through a communications link and/or through a connection to an input/output unit. The communications link and/or the connection may be physical or wireless in the illustrative examples.

The different components illustrated and/or described for control system 114 are not meant to provide architectural limitations to the manner in which different embodiments may be implemented. The different illustrative embodiments may be implemented in a data processing system including components in addition to or in place of those illustrated for control system 114.

In the embodiment illustrated in FIG. 1, memory 132 includes an allocation module 134 and energy data 136. In FIG. 1, allocation module 134 is illustrated as computer software that is accessible and executable by processor unit 130. However, allocation module 134 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). Allocation module 134 is used to monitor and/or control various operating parameters of system 100. For example, in some embodiments, allocation module 134 may monitor and record energy production values, temperature values (e.g., the temperature of waste vegetable oil 120), control the operating speed of engine 110, monitor and control the levels of energy output(s) 118 and/or monitor and adjust operating parameters of system 100 based on various power inputs to allocator 102. For example, in some embodiments, one or more direct current (DC) input devices 138 may be coupled to allocator 102 to provide DC voltage supplies. As will be described in further detail below, allocation module 134 monitors the level of DC power input and controls and/or adjusts various operating parameters of system 100 to efficiently utilize system 100 resources. Various types of operating parameter information and/or energy input/output information may be stored in memory 132 as energy data 136.

Power system 116 is used to control a level of energy output by system 100 based on various operating parameters of system 100 and/or the levels of energy inputs to system 100. For example, in some embodiments, power system 116 includes a rectifier 140, a DC input combiner 142 and an inverter 144. Rectifier 140 may be coupled to generator 112 to receive an AC output by generator 112 and convert the AC output from generator 112 to a DC output. DC input combiner 142 combines the DC output from rectifier 140 with DC inputs from one or more DC input devices 138. For example, DC input device(s) 138 may include a solar energy device, a wind turbine device, or any other type of DC input power source. The combined DC inputs are output by DC input combiner 142 to inverter 144, where the DC input is converted to an AC output. In some embodiments, allocation module 134 monitors the levels of the DC inputs from device(s) 138 and/or the AC level output by inverter 144 and modulates an operating parameter of system 100 such as, but not limited to, an operating speed of engine 110 or a fuel mixture delivered to engine 110.

In the embodiment illustrated in FIG. 1, facility 104 includes an air conditioning unit(s) 150, a cooling unit(s) 152 and a heating unit(s) 154. Air conditioning unit(s) 150 may be any type of device for providing environmental heating and/or cooling for facility 104. Cooling unit(s) 152 may comprise any type of device for providing a reduced temperature environment or resource such as, but not limited to, a refrigeration unit(s) 160 and a freezer unit(s) 162 (e.g., for maintaining perishable food items) or a device for providing reduced temperature water, such as a drinking fountain. Heating unit(s) 154 may comprise any type of device that provides and/or operates at an elevated temperature such as, but not limited to, a warming unit(s) 164 for maintaining cooked foods at a desired temperature, a cooking unit(s) 166 for cooking and/or otherwise preparing a food item, or a hot water heater. It should be understood that the types of units and/or devices employed by a particular type of facility may vary. As will be described in further detail below, energy output(s) 118 from system 100 may be used as a resource for operating various devices of facility 104 and/or waste energy may be captured from one or mode devices of facility 104 by system 100 and allocated as desired by system 100.

Figure 2:
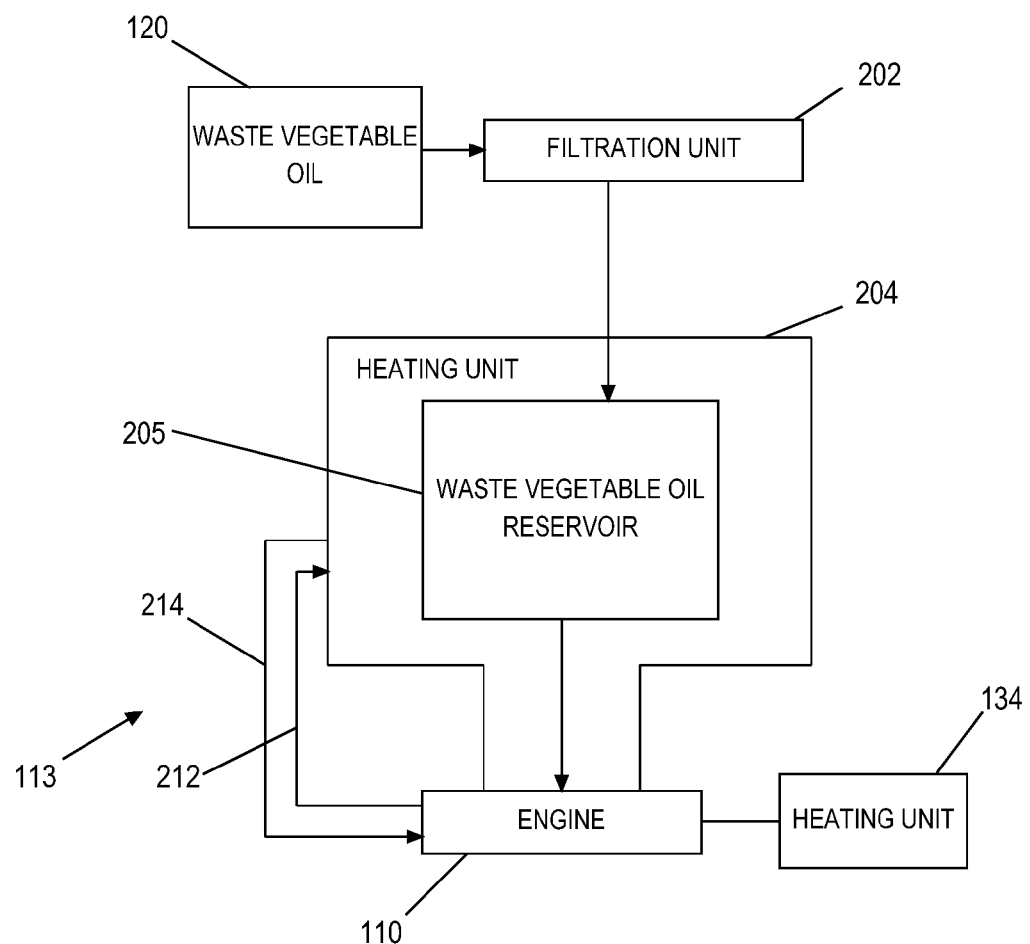
FIG. 2 is a diagram illustrating an embodiment of a filtration system and a heating system of the energy allocation system of FIG. 1 in accordance with the present disclosure.

FIG. 2 is a diagram illustrating an embodiment of filtration system 113 and a heating system 200 of system 100. In the embodiment illustrated in FIG. 2, filtration system 113 includes a filtration unit 202 for filtering and/or otherwise removing certain impurities from waste vegetable oil 120 in preparation for use as a fuel for engine 110. In some embodiments, heating system 200 is used to pre-heat waste vegetable oil 120 in preparation for use by engine 110 and/or pre-heat engine 110. For example, in some embodiments, system 200 includes a heating unit 204 for heating waste vegetable oil 120 contained in a waste vegetable oil reservoir 205 and a heating unit 206 for pre-heating engine 110. Heating units 204 and/or 206 may comprise an electric heating loop, insulated jacket or other type of device for pre-heating waste vegetable oil 120 and engine 110, respectively. In this embodiment, heating units 204 and 206 are used to heat waste vegetable oil 120 and engine 110 to a desired temperature before start-up of engine 110. In some embodiments, heating units 204 and/or 206 are powered by an external power source, such as an AC power source. In some embodiments, system 100 may be configured to utilize an AC energy output 118 to power heating units 204 and/or 206. For example, in some embodiments, heating units 204 and 206 may be initially operated using an external AC power supply then transitioned to an AC power supply provided as an output 118 by system 100. Additionally, in some embodiments, after start-up and operation of engine 110 for a time period such that engine 110 is operating at or above a desired temperature, operation of heating unit 206 may be discontinued.

In some embodiments, heating system 200 includes an engine oil loop 210 to provide waste heat energy from engine 110 as a heating resource for pre-heating waste vegetable oil 120. For example, loop 210 may include a hot oil supply line 212 directing heated oil resulting from the operation of engine 110 to reservoir 205, and a return line 214 for returning the oil to engine 110. The waste heat energy captured from the engine oil is used to pre-heat waste vegetable oil 120. Further, after start-up and operation of engine 110 for a time period such that the engine oil loop 210 is able to pre-heat waste vegetable oil 120 independent of another heat source, operation of heating unit 204 may be discontinued. As described above, various operating temperature parameters may be measured and monitored by allocation module 134 to control the operation of heating units 204 and 206 such as, but not limited to, the temperature of engine 110, the temperature of engine oil loop 210, and the temperature of waste vegetable oil 120 contained in reservoir 205.

Figure 3:
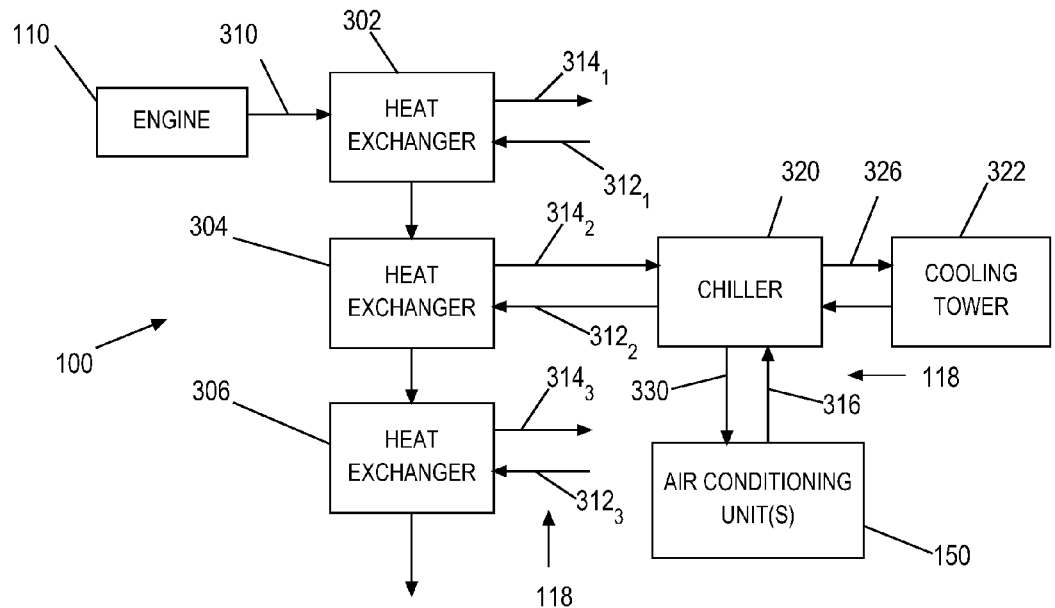
FIG. 3 is a diagram illustrating an embodiment of an energy output of the energy allocation system of FIG. 1 in accordance with the present disclosure.

FIG. 3 is a diagram illustrating one type of energy output 118 from system 100 that may be provided to and utilized by facility 104. In this embodiment, system 100 includes heat exchangers 302, 304 and 306 for providing three different temperature fluid streams as energy outputs 118 usable by facility 104. In the illustrated embodiment, three heat exchangers 302, 304 and 306 are utilized and connected in series with one another; however, it should be understood that the quantity and arrangement of heat exchangers may be varied. In this embodiment, exhaust heat energy from engine 110, represented by reference numeral 310, is directed to heat exchangers 302, 304 and 306. A fluid $312_1$, $312_2$ and $312_3$ circulating through respective heat exchangers 302, 304 and 306 captures the waste heat energy from engine 110 to generate respective elevated fluid temperature streams $314_1$, $314_2$ and $314_3$. For example, fluid temperature stream $314_1$ may be a high-temperature fluid stream provided to cooking unit(s) 166 of facility 104 (e.g., as a heat energy source for frying or broiling food items), fluid temperature stream $314_2$ may be a medium or moderately high-temperature fluid stream provided to warming unit(s) 164 of facility 104 (e.g., for maintaining cooked food items at a desired temperature), and fluid temperature stream $314_3$ may be a lower elevated temperature stream usable by facility 104 to provide warm domestic water. It should be understood that the different elevated temperature fluid streams may be used for different purposes.

In some embodiments, system 100 may further include a chiller 320 and a cooling tower 322 to provide an energy output 118 in the form of a chilled or low temperature fluid stream 330 usable by facility 104. For example, in the illustrated embodiment, fluid temperature stream $314_2$ is directed toward chiller 320 from heat exchanger 304. An elevated temperature stream 316 is directed toward chiller 320 from air conditioning unit 150. Thermal energy received by chiller 320 from streams $314_2$ and 316 is used as working energy to output a chilled or low-temperature fluid stream 330 which is directed toward air conditioning unit 150 (or another device of facility 104). Cooling tower 322 is used to exhaust thermal energy from chiller 320 to the environment via a fluid circulation stream 326. It should be understood that various temperature and/or other operating parameters or conditions may be measured and monitored by allocation module 134 in providing elevated and/or cooled fluid temperature streams as energy outputs 118 usable by facility 104 such as, but not limited to, the temperatures of such fluid streams and the flow rates of such fluid streams.

Figure 4:
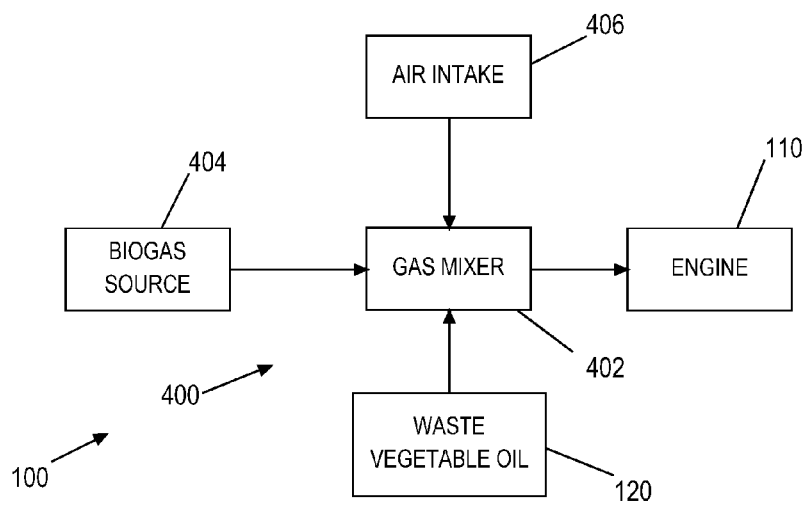
FIG. 4 is a diagram illustrating an embodiment of a an embodiment of a fuel enhancement system for the energy allocation system of FIG. 1 in accordance with the present disclosure.

FIG. 4 is a diagram illustrating an embodiment of a fuel enhancement system 400 for system 100. Fuel enhancement system 400 may be used to boost or increase the operating performance of engine 110. In some embodiments, system 400 includes a fuel mixer 402 and a biogas source 404 (e.g., natural gas or another fuel supplement). In operation, allocation module 134 controls the input of biogas source 404 and an air intake 406 to gas mixer 402 in combination with waste vegetable oil 120 as a fuel source for engine 110. Allocation module 134 may also monitor and regulate the output of engine 110 and/or generator 112 (e.g., by controlling the operating speed of engine 110) to provide a desired output.

Figure 5:
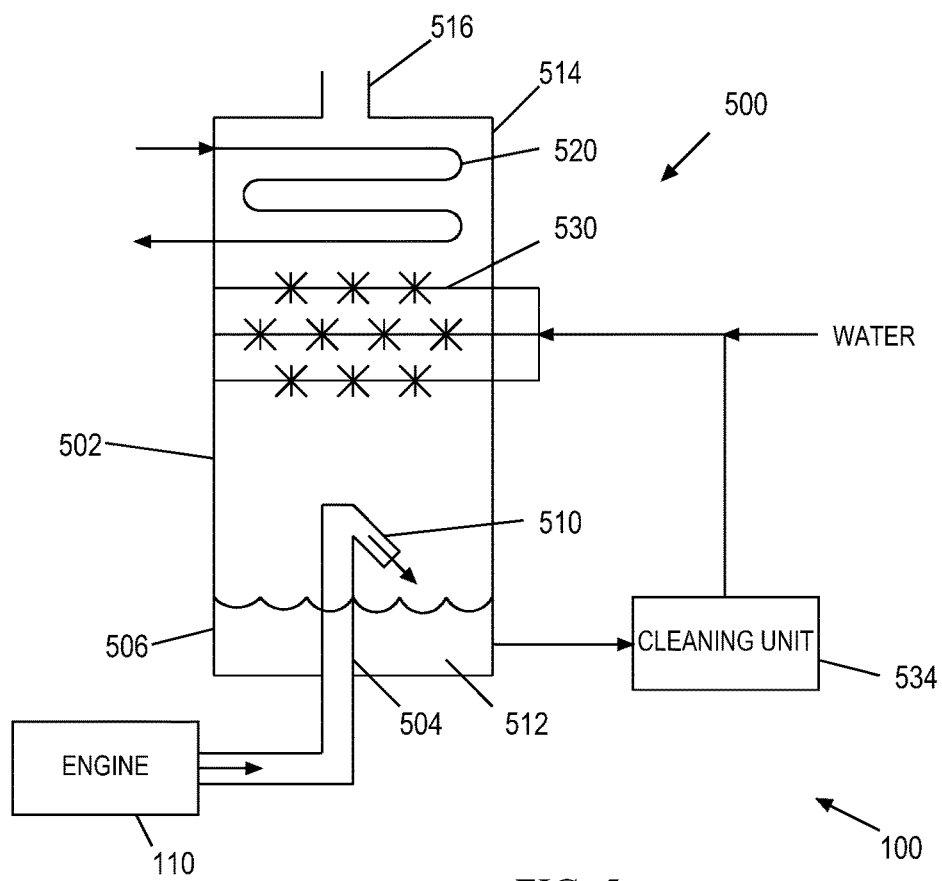
FIG. 5 is a diagram illustrating an embodiment of an exhaust cleaning system of the energy allocation system of FIG. 1 in accordance with the present disclosure.

FIG. 5 is a diagram illustrating an embodiment of an exhaust cleaning system 500 that may be included in system 100 to clean and/or reduce airborne emissions from the exhaust of engine 110. In the embodiment illustrated in FIG. 5, system 500 includes a cleaning tower 502 having an input 504 located at a lower end 506 of tower 502 for receiving waste exhaust energy 508 from engine 110. In some embodiments, input 504 extends upwardly within tower 502 and includes a downwardly facing outlet 510 for reducing noise. Lower end 506 of tower 502 contains a fluid 512 for capturing emission particles from exhaust 508. An upper end 514 of tower 502 includes an outlet 516 for emitting the exhaust to the environment. Within tower 502 near upper end 514 is a chilled fluid loop 520 for reducing a temperature of the exhaust emitted through outlet 510 and/or enabling condensation of fluid vapor within tower 502 (e.g., fluid 512) to further reduce the emission of particles from outlet 516. Chilled fluid loop 520 may comprise a chilled temperature fluid stream as illustrated in FIG. 3 (e.g., fluid stream 330) produced by system 100. System 500 also includes an array of fluid misters/atomizers 530 located within a medial area of tower 502 to atomize and/or otherwise create a fine spray of fluid particles to remove pollutants in the exhaust stream. Fluid 512 located at lower end 506 of tower 502 may be circulated through a cleaning unit 534 (e.g., a centrifuge) to remove particulate matter therefrom and thereafter provided to misters 530. Additional fluid may be provided to misters 530 (and to lower end 506 of tower 502) to accommodate fluid loss as needed. Thus, in operation, exhaust 508 from engine 110 enters input 504 and is discharged through outlet 510. As the exhaust travels upwardly through tower 502, misters 530 emit an atomized fluid mist to cause particulate matter to be caught therein and fall downwardly to be collected in fluid 512 located at lower end 506 of tower 502. As the exhaust continues moving upwardly within tower 502, chilled fluid loop 520 reduces the temperature of the exhaust and/or further condensates fluid vapor before the exhaust is discharged through outlet 516.

Figure 6:
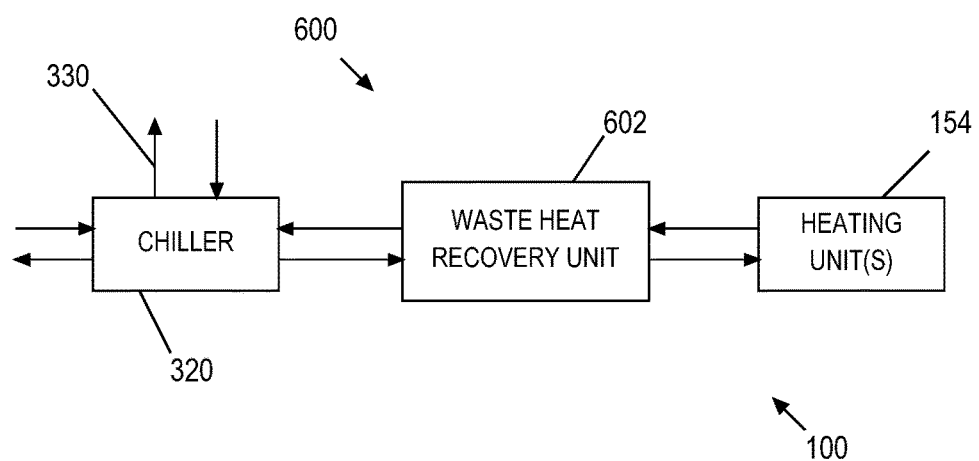
FIG. 6 is a diagram illustrating an embodiment of a waste heat recovery system of the energy allocation system of FIG. 1 in accordance with the present disclosure.

FIG. 6 is a diagram illustrating an embodiment of a waste heat recovery system 600 that may be included in embodiments of system 100. In the embodiment illustrated in FIG. 6, system 600 includes a waste heat recovery system 602 coupled to and/or in close proximity to heating unit(s) 154 of facility 104. Heat recovery system 602 may include a heat exchanger or other type of device for capturing waste heat energy generated by one or more heat-generating devices of facility 104 such as, but not limited to, cooking unit(s) 166 and warming unit(s) 164. In the embodiment illustrated in FIG. 6, a fluid is circulated through and/or near heating unit(s) 154 to capture waste heat energy via heat recovery system 602 and then transferred to chiller 320. Chiller 320 may be coupled to a cooling tower (e.g., such as cooling tower 322) to discharge heat energy to the atmosphere. Further, chiller 320 generates a chilled fluid loop (e.g., such as chilled fluid loop 330) using heat energy received from unit 602. In some embodiments, if the temperature level of the fluid provided to chiller 320 is insufficient to produce a desired low-temperature stream 330, the temperature of the fluid provided to chiller 320 may be increased by a heating unit or other type of device.

Figure 7:
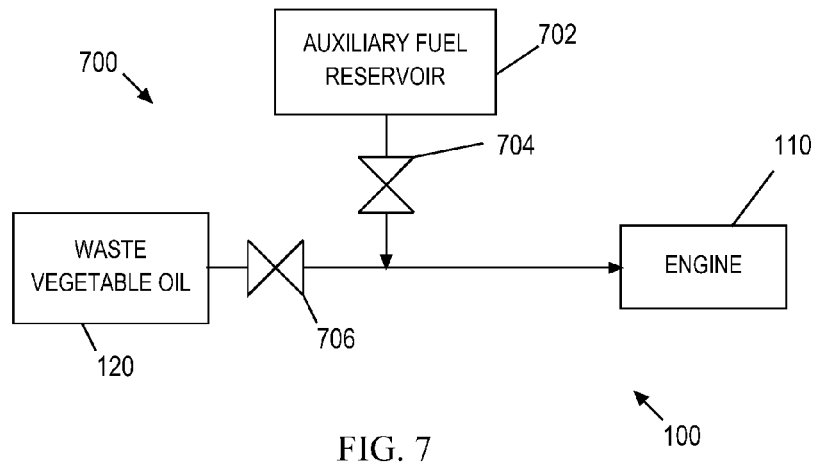
FIG. 7 is a diagram illustrating an embodiment of an auxiliary fuel system of the energy allocation system of FIG. 1 in accordance with the present disclosure.

FIG. 7 is a diagram illustrating an embodiment of an auxiliary fuel system 700 that may be included in embodiments of system 100. In the embodiment illustrated in FIG. 7, system 700 includes an auxiliary fuel reservoir 702 couplable to engine 110. In some embodiments, control system 114 is configured to control actuation of valves 704 and 706 to control delivery of either waste vegetable oil 120 or an auxiliary fuel contained in reservoir 702 to engine. For example, an auxiliary fuel may be used to perform engine 110 cleaning to remove deposits that may accumulate from combusting waste vegetable oil 120.

Figure 8:
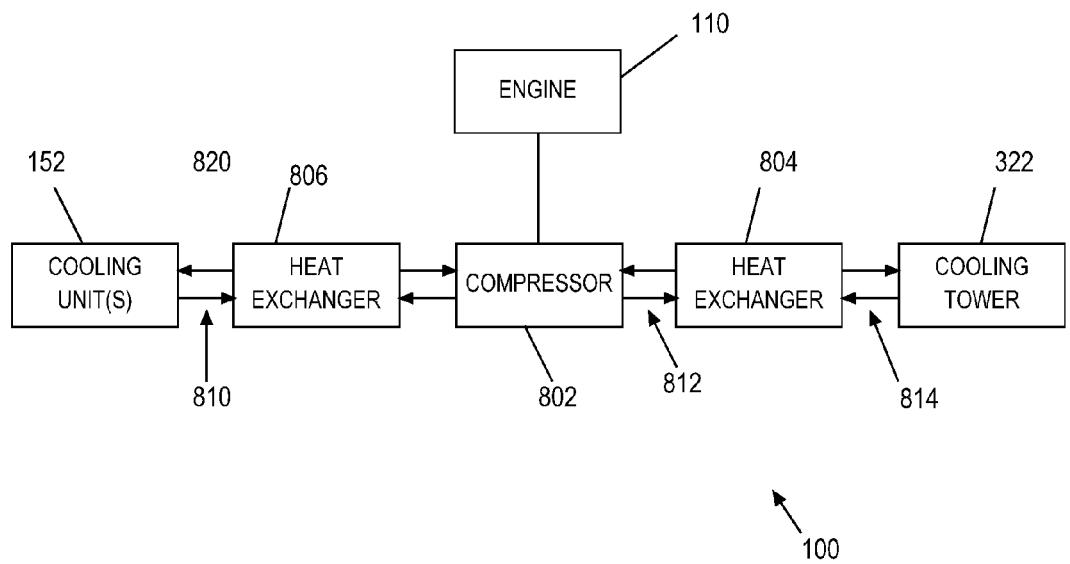
FIG. 8 is a diagram illustrating an embodiment of the energy allocation system of FIG. 1 for generating a low-temperature or chilled fluid stream in accordance with the present disclosure.

FIG. 8 is a diagram illustrating an embodiment of system 100 for generating a low-temperature or chilled fluid stream usable by facility 104. In the embodiment illustrated in FIG. 8, system 100 includes a compressor 802 driven by engine 110. System 100 also includes heat exchangers 804 and 806 coupled to compressor 802. Heat exchanger 804 is coupled to cooling tower 322, and heat exchanger 806 is coupled to a device of facility 104 that may utilize a low-temperature fluid such as, but not limited to, cooling unit(s) 152. System 100 includes a low-temperature fluid circulation loop 810 and a heat rejection fluid circulation loop 812. In operation, fluid is circulated from compressor 802 to heat exchanger 804 where heat is dissipated from the circulating fluid via a fluid loop 814 utilizing cooling tower 322. Fluid is received from heat exchanger 804 and directed to heat exchanger 806 via compressor 802, where heat exchanger 806 absorbs heat energy received from fluid circulation loop 810. Fluid circulation loop 810 circulates a fluid through heat exchanger 806 to produce a low-temperature fluid stream 820 that is directed toward cooling unit(s) 152 of facility 104. Thus, in operation, heat exchanger 806 functions as an evaporator to collect heat energy and produce low-temperature fluid stream 820, and heat exchanger 804 functions as a condenser to dissipate heat energy acquired from cooling unit(s) 152 of facility 104.

Figure 9:
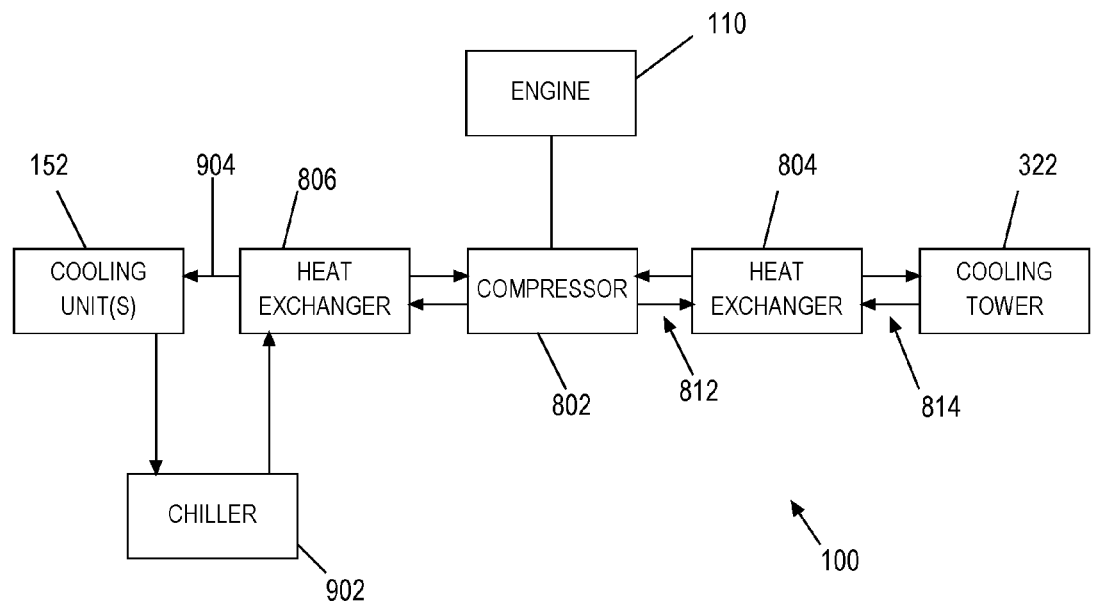
FIG. 9 is a diagram illustrating an embodiment of the energy allocation system of FIG. 1 for generating a further reduced low-temperature or sub-chilled a fluid stream in accordance with the present disclosure.

FIG. 9 is a diagram illustrating an embodiment of system 100 for further reducing a temperature of a fluid usable by facility 104. In the embodiment illustrated in FIG. 9, system 100 includes compressor 802 driven by engine 110, heat exchangers 804 and 806, cooling tower 322 and a chiller 902. Chiller 902 is used to reduce a temperature of a fluid circulating through and/or to cooling unit(s) 152 of facility 104 before being delivered to heat exchanger 806 such that heat exchanger 806 outputs a sub-chilled fluid temperature stream 904 usable by facility 104, such as by freezer unit(s) 162.

Figure 10:
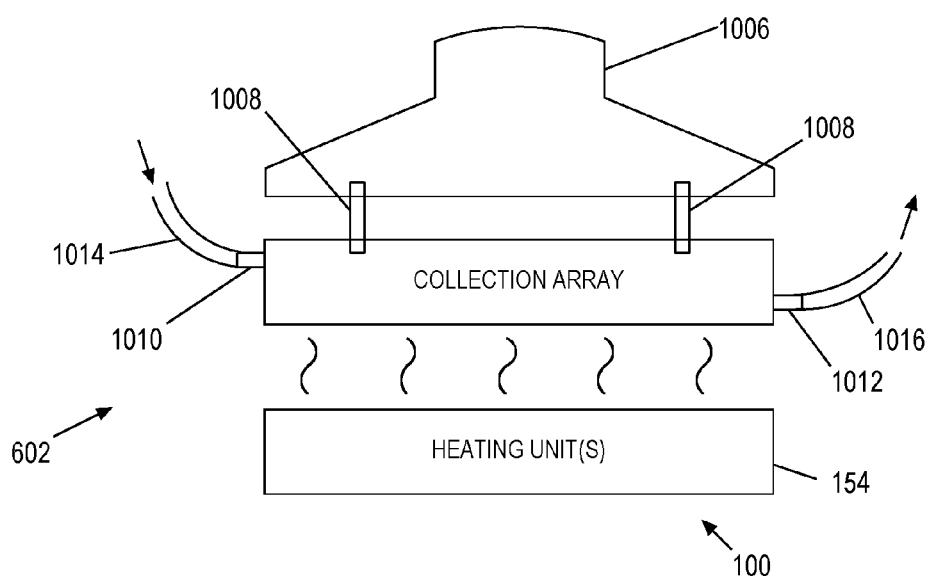
FIG. 10 is a diagram illustrating an embodiment of a waste heat recovery system of the energy allocation system of FIG. 1 in accordance with the present disclosure.

FIG. 10 is a diagram illustrating an embodiment of waste heat recovery system 602. In the embodiment illustrated in FIG. 10, system 602 is located above and in general close proximity to a heat-generating device of facility 104, such as heating unit(s) 154. In this embodiment, system 602 includes a waste heat collection array 1004 for capturing waste heat energy traveling upwardly from heating unit(s) 154. In the illustrated embodiment, heat collection array 1004 is movably coupled to a vent hood 1006 via mounting assemblies 1008 to facilitate upward/downward movement of array 1004 relative to hood 1006, thereby enabling array 1004 to be easily removed for cleaning or other purposes. However, it should be understood that array 1004 may be otherwise located and/or secured relative to heating unit(s) 154. Mounting assemblies 1008 may comprise sliding bracket assemblies, scissor-hinged arm assemblies or other types of devices for enabling upward/downward movement of array 1004. It should be further understood that array 1004 may be located above heating unit(s) 154 without upward/downward movement capability (e.g., mounted in a fixed position).

In the embodiment illustrated in FIG. 10, a fluid is circulated through array 1004 to collect waste heat energy generated by heating unit(s) 154. In FIG. 10, array 1004 includes an inlet 1010 and an outlet 1012 to accommodate connection of fluid-carrying tubes 1014 and 1016 to array 1004.

Figure 11:
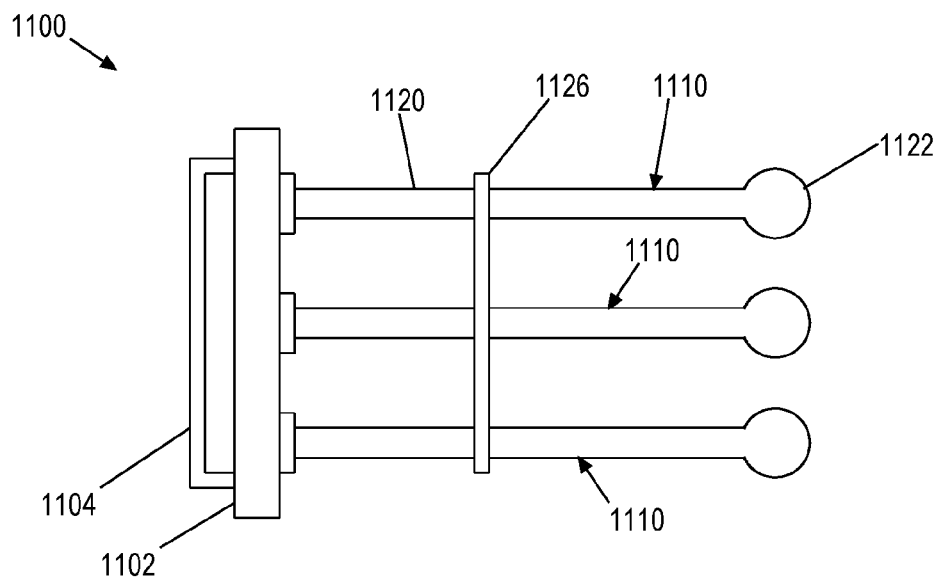
FIG. 11 is a diagram illustrating an embodiment of a heat pipe assembly of the waste heat recovery system of FIG. 10 in accordance with the present disclosure.

FIG. 11 is a diagram illustrating an embodiment of a heat pipe assembly 1100 of array 1004. In the embodiment illustrated in FIG. 11, assembly 1100 includes a base member 1102, a handle 1104 coupled to base member 1102, and heat pipes 1110 coupled to base member 1102. In this embodiment, three heat pipes 1110 are illustrated; however, it should be understood that a greater or fewer quantity of heat pipes 1110 may be used. Each heat pipe includes an elongated portion 1120 and an enlarged, bulb-shaped reservoir 1122. Each heat pipe 1110 contains a fluid medium for collecting heat energy. In FIG. 11, a uniform spacing is maintained between heat pipes 1110 using a spacing element 1126.

Figure 12:
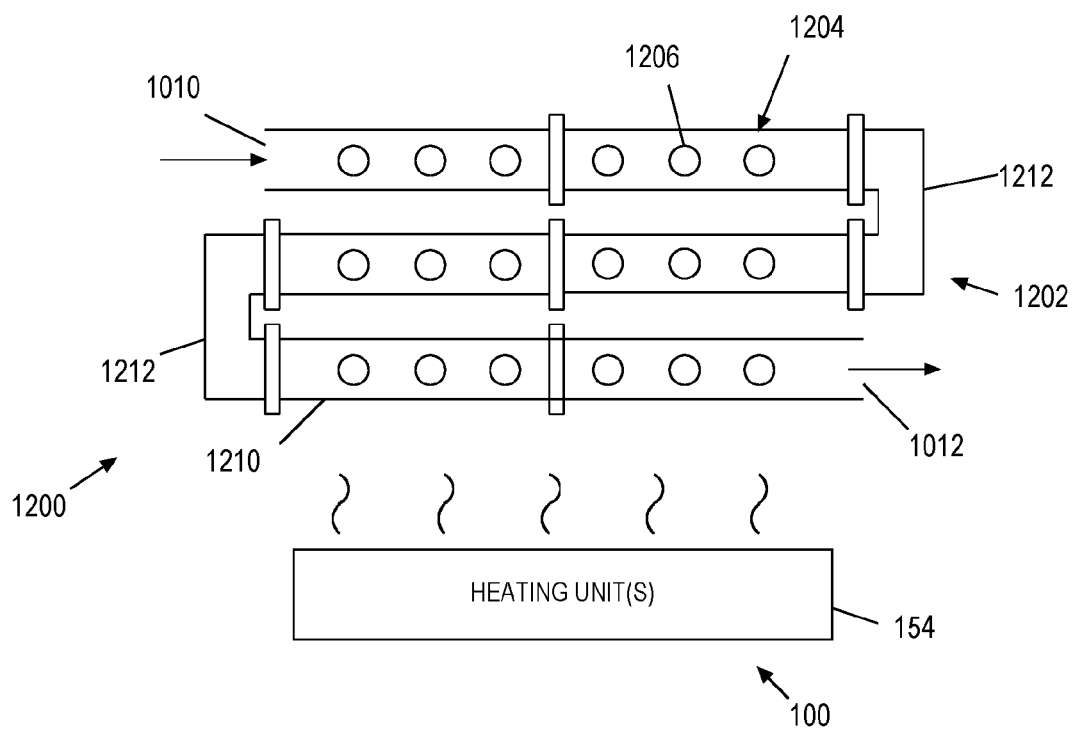
FIG. 12 is a diagram illustrating an embodiment of a collection assembly of the waste heat recovery system of FIG. 10 in accordance with the present disclosure.

FIG. 12 is a diagram illustrating an embodiment of a collection assembly 1200 of array 1004. In this embodiment, assembly 1200 includes a receiver assembly 1202 comprising one or more receiver elements 1204 for containing a heat-collecting fluid therein and having formed thereon one or more external surface cavities 1206 for receiving placement of reservoir 1122 (FIG. 11) therein. For example, in some embodiments, cavities 1206 are formed and/or otherwise shaped to receive insertion of reservoir 1122 of heat pipe 110 therein, thereby enabling insertion and removal of heat pipe assembly 110. Cavities 1206 are formed to preferably maximize surface area contact between an exterior surface area of reservoir 1122 and an interior surface area of cavities 1206, thereby facilitating heat energy transfer from reservoirs 1122 to the fluid contained in elements 1204. Elements 1204 may include elongated elements 1210 and directional elements 1212 to accommodate directional changes of assembly 1200 and/or to facilitate changes in length or position. For example, in the embodiment illustrated in FIG. 12, assembly 1200 is configured to receive six heat pipe assemblies 1100 each having three heat pipes 1110, where the heat pipe assemblies 1100 are positioned in two vertical rows with each row having three heat pipe assemblies 1100. In FIG. 12, elements 1204 are arranged and/or positioned to form a vertical spaced-apart relationship between corresponding heat pipe assemblies 1100. However, it should be understood that receiver assembly 1202 may be otherwise formed and/or configured.

Figure 13:
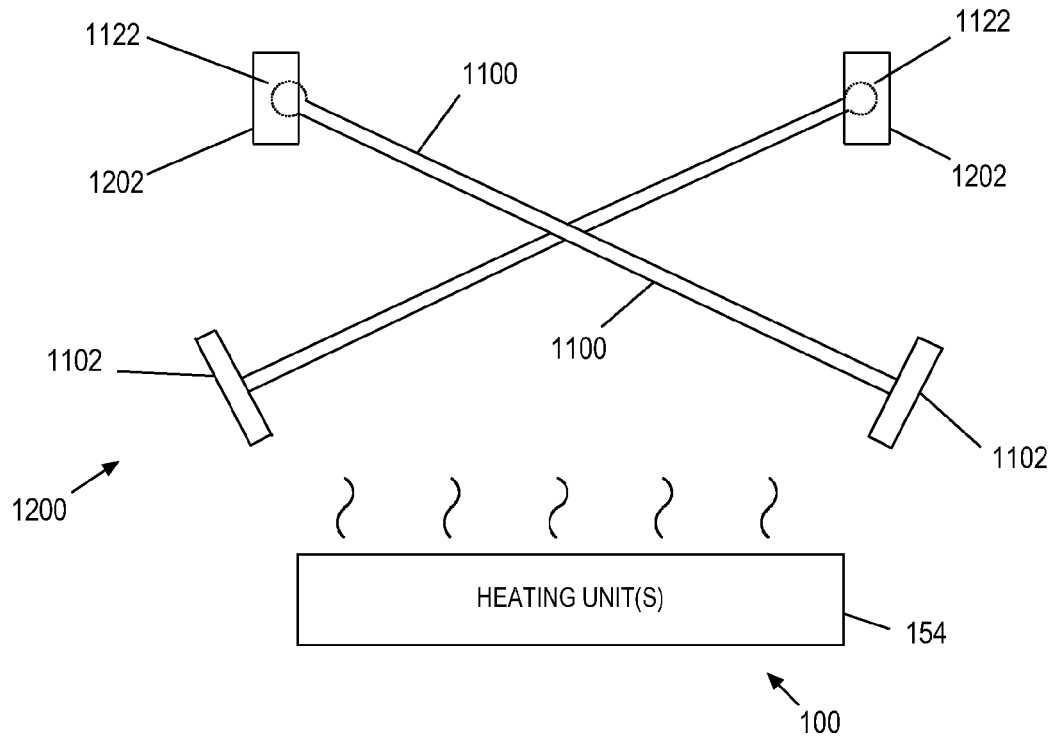
FIG. 13 is a diagram illustrating an embodiment of collection array of the waste heat recovery system of FIG. 10 in accordance with the present disclosure.

FIG. 13 is a diagram illustrating an embodiment of collection array 1004 of system 602 using two receiver assemblies 1202. In the illustrated embodiment, receiver assemblies 1200 are located in a spaced apart relationship relative to each other and located on opposite sides of heating unit(s) 154. Heat pipe assemblies 1100 are positioned such that reservoirs 1122 are located at an elevated position relative to respective base members 1102 to facilitate heat energy transfer upwardly toward reservoirs 1122. Preferably, heat pipe assemblies 1100 are positioned laterally offset from each other to maximize exposure of heat pipe assemblies 1100 to heat energy radiating upwardly from heating unit(s) 154. Thus, in operation, waste heat energy radiating upwardly from heating unit(s) 154 is captured by heat pipe assemblies 1100 and transferred to collection assemblies 1200, where fluid circulating within collection assemblies 1200 removes the waste heat energy and transfers the waste heat energy for another use such as, but not limited to, providing an elevated temperature fluid stream for another device of facility 104, such as a chiller or a warming unit.

It should be understood that multiple heat collection arrays 1004 may be coupled together, in series and/or parallel. For example, in some embodiments, multiple heat collection arrays 1004 may be connected in series extending from one heating unit 154 of facility 104 to another heating unit 154 of facility 104. In some embodiments, the waste heat energy collecting fluid circulating through heat collection arrays 1004 flows in the direction from the lower temperature heat source to the higher temperature heat sources. In some embodiments, a temperature boosting device may be placed in the path of the circulating fluid to further elevate a temperature of the circulating fluid if necessary to obtain a desired temperature level of the fluid. As described above, control system 114 may monitor and/or record various operating parameters in connection with heat recovery unit(s) 602 such as, but not limited to, temperature levels at various locations and fluid flow rates.

Figure 14:
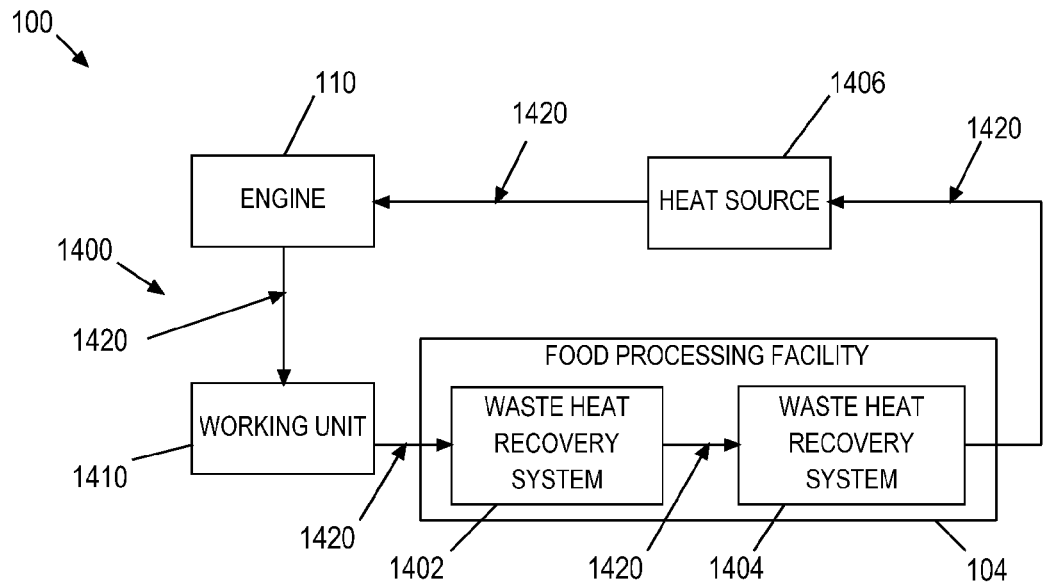
FIG. 14 is a diagram illustrating an embodiment of a heat recovery system of the energy allocation system of FIG. 1 in accordance with the present disclosure.

FIG. 14 is a diagram illustrating an embodiment of a heat recovery system 1400 which may be included in system 100. In the embodiment illustrated in FIG. 14, system 1400 includes waste heat recovery systems 1402 and 1404, a heat source 1406, engine 110 and a working unit 1410. Waste heat recovery systems 1402 and 1404 may comprise any device for capturing waste heat energy from one or more heat-generating devices of facility 104. For example, waste heat recovery systems 1402 and 1404 may include a device or system such as waste heat recovery system 602 (FIG. 10). In FIG. 14, two waste heat recovery systems 1402 and 1404 are shown; however, it should be understood that a greater or fewer quantity of waste heat recovery systems may be used.

Heat source 1406 may include any type of device for increasing a temperature of a fluid loop 1420 circulating through system 1400. For example, in some embodiments, heat source 1406 may include a solar device for capturing solar energy and transferring resulting thermal energy to fluid loop 1420; however, it should be understood that other types of devices may be used for increasing the temperature of fluid loop 1420. Working unit 1410 may comprise any device for taking heat energy supplied by fluid loop 1420 and utilizing the heat energy to produce a desired result, such as chiller 320 (FIG. 3) for producing a low-temperature fluid stream that may be utilized by an air conditioning unit of facility 104. In the illustrated embodiment, fluid loop 1420 is also connected to and/or otherwise captures thermal energy generated by engine 110 (e.g., via a heat exchanger, such as heat exchanger 302 (FIG. 3) of other type of device).

In operation, a fluid collection medium contained by fluid loop 1420 is configured to increase in temperature as the fluid loop 1420 collection medium reaches working unit 1410. For example, in some embodiments, waste heat recovery system 1402 may be associated with the lowest temperature heat source of facility 104 (e.g., warming unit 164) while waste heat recovery system 1404 may be associated with a higher temperature heat source of facility 104 (e.g., cooking unit 166). Thus, as the fluid loop 1420 collection medium flows from the lower temperature heat source(s) of facility 104 to the higher temperature heat source(s) of facility 104, the temperature of the fluid loop 1420 collection medium increases.

If the temperature of the fluid loop 1420 collection medium received from facility 104 is insufficient to perform the work desired (e.g., a large enough temperature differential), heat source 1406 and/or engine 110 may be used to further increase the temperature of the fluid loop 1420 collection medium to obtain a desired temperature differential in connection with working unit 1410. Thus, in some embodiments, control system 114 (e.g., allocation module 134) monitors the temperature at various stages or points along fluid loop 1420 and may control the utilization of heat source 1406 as needed and/or may cause the fluid loop 1420 collection medium to capture thermal energy from engine 110 as needed (e.g., via control of a bypass valve). Further, control system 114 (e.g., allocation module 134) may monitor and control a flow rate of the fluid loop 1420 collection medium to increase the efficiency of heat collection (e.g., increasing or decreasing the flow rate to increase the efficiency of heat collection based on the temperature of the various heat-supplying resources). Thus, system 1400 may be configured to enhance heat recovery and utilization from heat-generating devices of facility 104 to produce a desired energy output 118.

Figure 15:
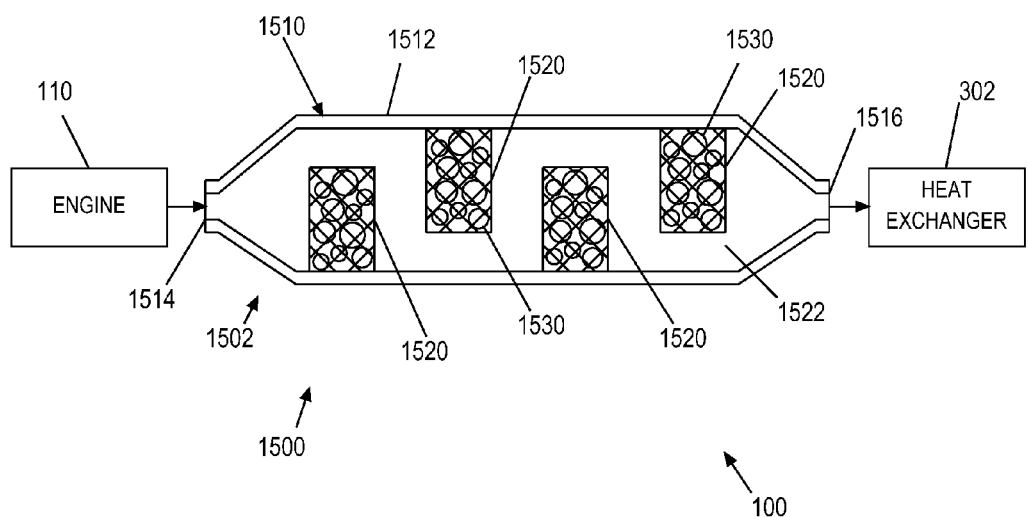
FIG. 15 is a diagram illustrating an embodiment of an exhaust cleaning system of the energy allocation system of FIG. 1 in accordance with the present disclosure.

FIG. 15 is a diagram illustrating an embodiment of an exhaust cleaning system 1500 that may be included in system 100 in accordance with the present disclosure. In the embodiment illustrated in FIG. 15, system 1500 includes a cleaning assembly 1502 comprising a housing 1510 having an outer wall 1512, an inlet 1514 for receiving exhaust from engine 110, and an outlet 1516 for discharging the cleaned exhaust to another unit, such as heat exchanger 302 (FIG. 3). In some embodiments, outer wall 1512 is configured having a double-wall construction to reduce sound emissions; however, it should be understood that housing 1510 may be constructed using a variety of different techniques. In the illustrated embodiment, assembly 1502 includes a number of mesh or gas-permeable containers 1520 located within an interior area 1522 of housing 1510. The quantity of containers 1520 may be varied depending on the size and/or shape of housing 1510. Containers 1520 include a cleaning medium 1530 disposed therein for absorbing and/or otherwise capturing emission particles from the exhaust of engine 110 as the exhaust travels through housing 1510 from inlet 1514 to outlet 1516. In some embodiments, lava rock or another type of porous material may be used as cleaning medium 1530; however, it should be understood that other types of cleaning medium types may be used in containers 1520.

Containers 1520 are configured to extend inwardly into interior area 1522 a sufficient distance to cause a substantial portion of the exhaust from engine 110 to pass through cleaning medium 1530 without impeding the performance of engine 110. In the embodiment illustrated in FIG. 15, containers 1520 are spaced apart from each other and arranged in an alternating offset position relative to each other to cause a substantial portion of the exhaust from engine 110 to pass through cleaning medium 1530 contained in each container 1520. In some embodiments, housing 1510 is configured having openings in wall 1512 to facilitate the insertion and removal of containers 1520 relative to housing 1510 to enable replacement of cleaning medium 1530.

Figure 16:
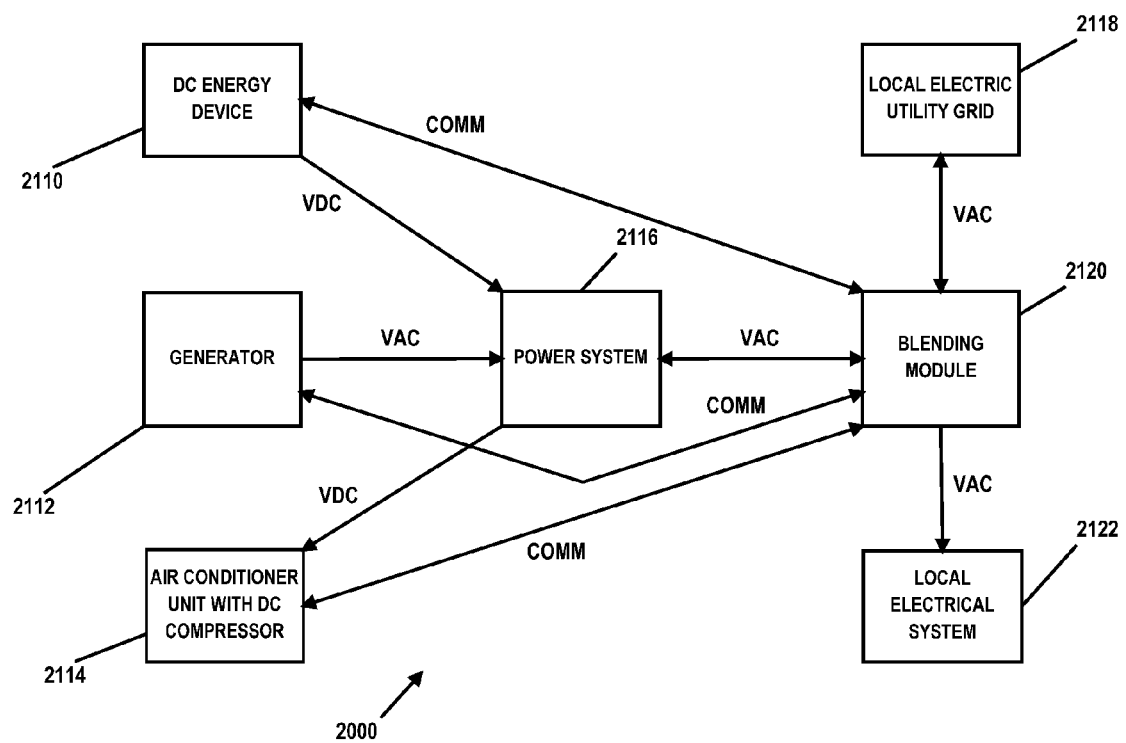
FIG. 16 is a diagram illustrating another embodiment of a energy allocation system according to the present disclosure.
Figure 17:
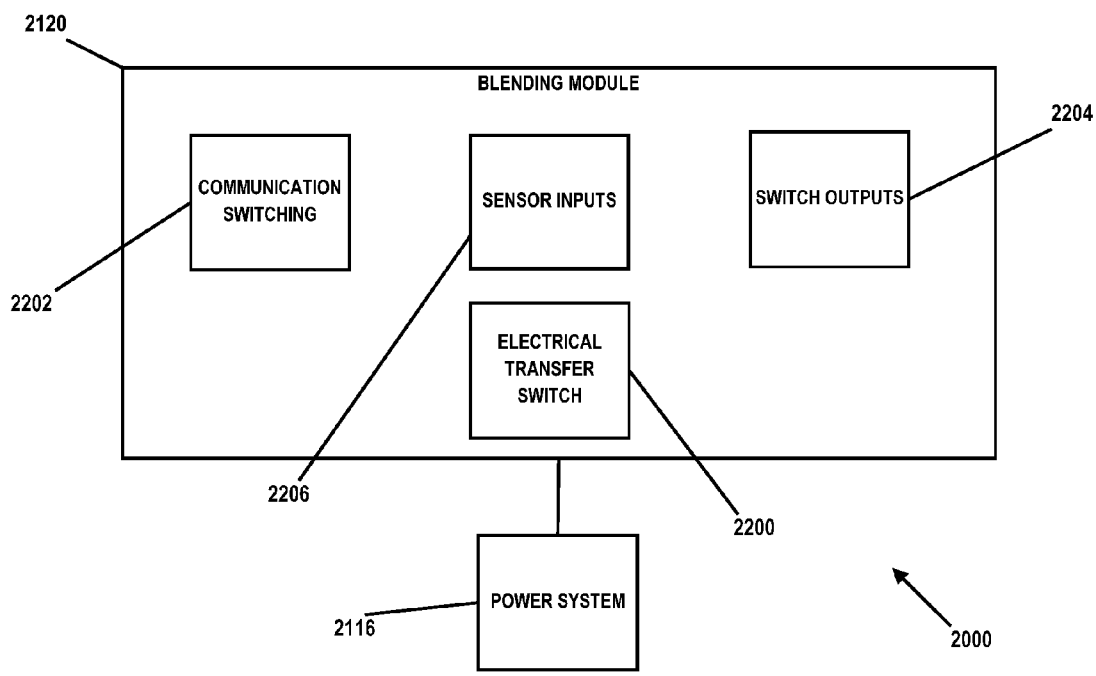
FIG. 17 is a diagram illustrating an embodiment of a blending module of the system of FIG. 16 according to the present disclosure.
Figure 18:
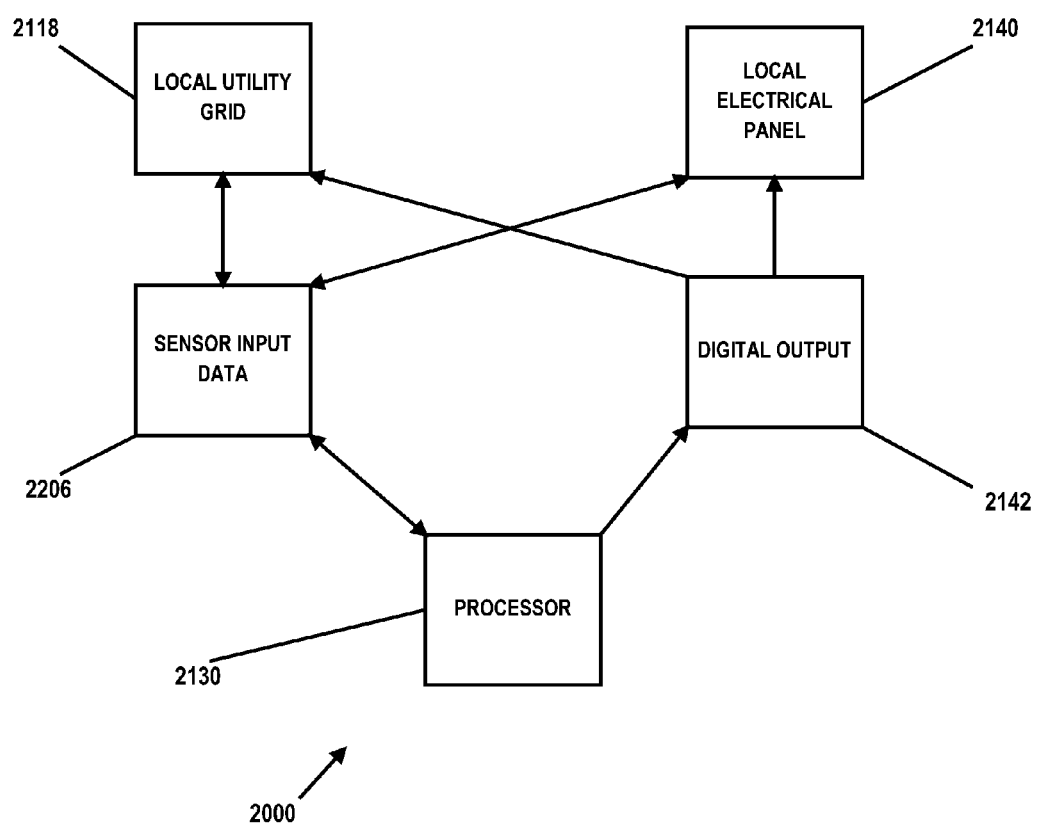
FIG. 18 is a diagram illustrating an embodiment of communications of the energy allocation system of FIGS. 16 and 17 according to the present disclosure.
Figure 19:
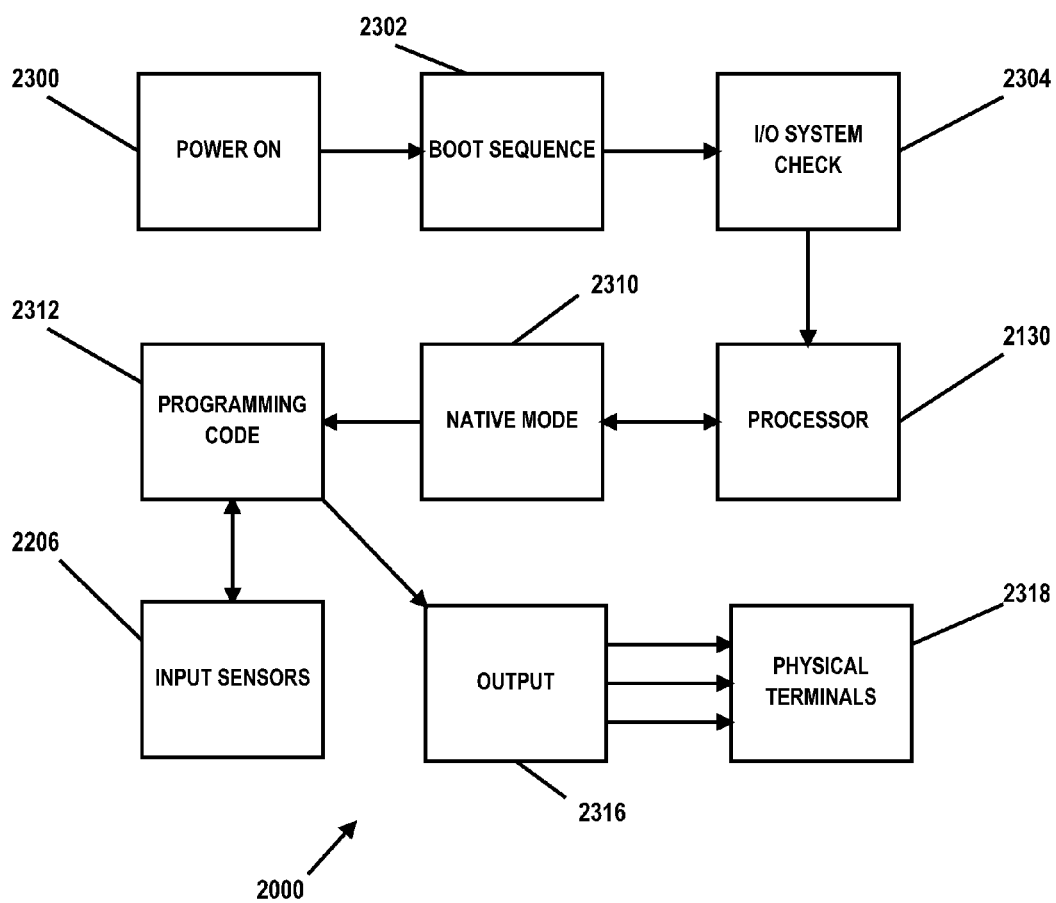
FIG. 19 is a diagram illustrating programming functions for the energy allocation system of FIGS. 16-18 according to the present disclosure.
Figure 20:
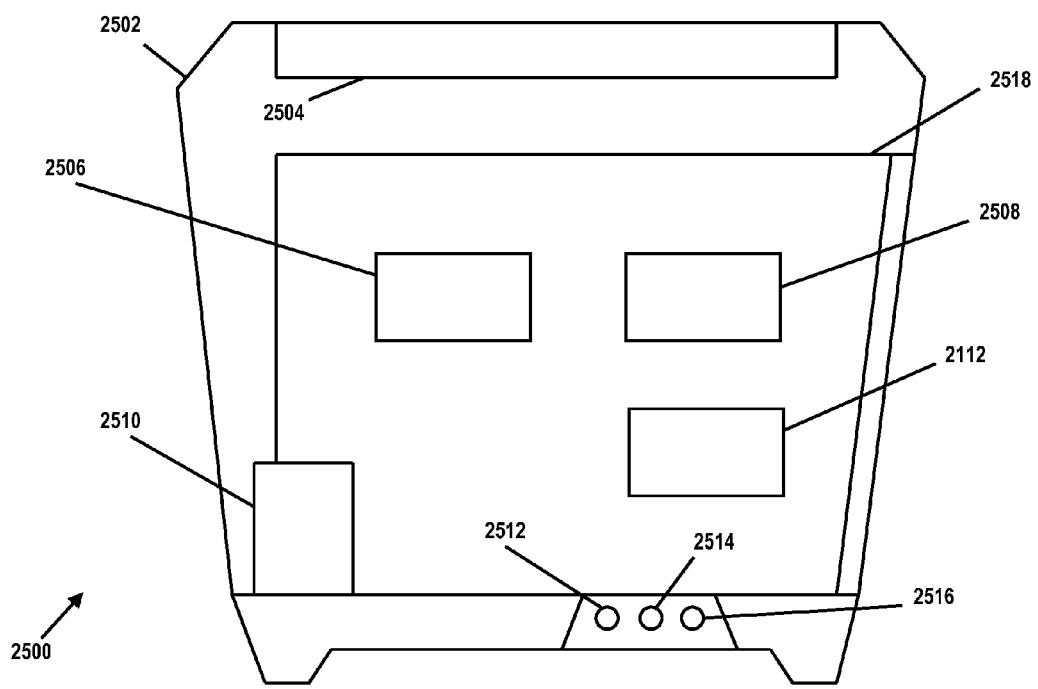
FIG. 20 is a diagram illustrating an embodiment of a functional unit employing the energy allocation system of FIGS. 16-19 according to the present disclosure.

FIG. 16 is a diagram illustrating another embodiment of an energy allocation system 2000 according to the present disclosure. FIG. 17 is a diagram illustrating an embodiment of a blending module 2120 of the system 2000 of FIG. 16 according to the present disclosure. FIG. 18 is a diagram illustrating an embodiment of communications of the energy allocation system 2000 of FIGS. 16 and 17 according to the present disclosure. FIG. 19 is a diagram illustrating programming functions for the energy allocation system 2000 of FIGS. 16-18 according to the present disclosure. FIG. 20 is a diagram illustrating an embodiment of a functional unit 2500 employing the energy allocation system 2000 of FIGS. 16-19 according to the present disclosure.

In FIG. 16, the system 2000 includes a power source power system 2116 (e.g., such as system 116), a DC energy device 2110 (e.g., a series of solar and/or photovoltaic cells), a generator 2112, an air conditioning unit 2114, and a blending module 2120. In FIG. 16, system 2116 is electrically coupled to DC energy device 2110, generator 2112, air conditioning unit 2114, and blending module 2120. Blending module 2120, in turn, is electrically coupled to a local electric energy grid 2118 and a local electrical system 2122 (e.g., a home or business local electrical system). Blending module 212 is also communicatively coupled to DC energy device 2110, generator 2112, and air conditioning unit 2114. Thus, FIG. 16 illustrates the inter-connectivity of a blended functionality air conditioning system's electrical connection and network communications. In the described embodiment, a solar DC energy source is used (e.g., solar cells for DC energy device 2110); however, it should be understood that other types of alternative DC energy sources may be used (e.g., wind-based devices).

In the illustrated embodiment, generator 2112 may operate using propane, natural gas, gasoline, or other type of fuel. Generator 2112 may be operated as a standby/backup generator or may be operated when desired (e.g., in nonstandby/backup applications, such as when efficiency, power rates or other factors indicate preferred use of generator 2112 instead of and/or in addition to other power sources). Air conditioning unit 2114 comprises a DC voltage-based compressor and fan (e.g., an AC to DC high torque variable speed compressor drive). Power system 2116 is used to control a type and level of energy output by system 2000 based on various operating parameters of system 2000 and/or the levels of energy inputs to system 2000. For example, in some embodiments, power system 2116 may include a DC input combiner and one or more rectifiers/inverters (e.g., similar to system 116 described hereinbefore). A rectifier may be used to receive an AC input (e.g., from local electric utility grid 2118) and convert the AC input to a DC output, and an inverter may be used to convert a DC input to an AC output. The DC input combiner may combine the DC inputs from multiple sources (e.g., generator 2212, solar energy device 2110, and/or an AC input converted to a DC output).

FIG. 17 illustrates an embodiment of blending module 2120, and FIG. 18 illustrates the communication connectivity between the blending module 2120's devices, a household electrical panel 2140 (e.g., part of local electrical system 2122), and local electric utility grid 2118. Similar to allocation module 134, blending module 2120 may comprise computer software that is accessible and executable by a processor unit (e.g., such as processor unit 2130) and embedded hardware. However, blending module 2120 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). Blending module 2120 is used to monitor and/or control various operating parameters of system 2116. For example, blending module 2120 may monitor an efficiency parameter of the compressor of air conditioning unit 2114 and adjust an operating speed of the compressor based on the efficiency parameter. In FIG. 17, blending module 2120 may comprise and/or be coupled to an electrical transfer switch 2200, include various communication switching devices 2202 and voltage output switching devices 2204. Blending module 2120 also sends and/or receives various sensor inputs 2206 to control and/or regulate power generation, usage and distribution. For example, as illustrated in FIG. 16, blending module may communicate with the DC energy device 2110, generator 2112 and/or the air conditioning system/compressor 2214 to send/read voltage, current and wattage values.

The blended functionality air conditioning system with VDC compressor and fan of system 2000 enables variable speed output in a diabatic closed loop system. The variable speed functionality allows for finite BTU attenuation lowering overall consumption of energy, thus increasing efficiency. The system 2000 with built-in power generator combining solar energy (e.g., via DC energy device 2110) connects to the blending module 2120 working in concert with local electrical utility grid 2118. System 2000 and its processes are configured with the functionality of load-carry, load-balance, and load-shed of both consumed and generated power with electrical utility grid connectivity and communication, such as:

Demand response: ability to reduce electric grid 2118 power usage during peak periods in response to time-based rates brought on by market supply and demand;

Grid sell-back: ability to generate power with the function and purpose of supplying the local electrical utility grid 2118 with power generated on-sight;

Load-shed: ability to generate power with the function and purpose of supplying air conditioning and/or household electrical needs, thus reducing the demand of power from the local electrical utility grid 2118;

Strike-price: ability for the blending module 2120 to analyze, process and execute set parameters with the intent to generate power for the use of the electric utility grid 2118 enabling set monetary parameters to sell generated power back to the electrical utility grid 2118;

Programming code functionality to offload partial or whole power produced from the system 2000 and other power storage or producing entities tied to blending module 2120 to electric utility grid 2118;

Split system generator head between electric utility grid 2118 and household electrical use; and Programming function governs AC and DC voltage fluctuations in accordance with sensor temp and continuity to increase or decrease VAC and VDC.

FIG. 18 is a diagram illustrating an embodiment of communications of the energy allocation system 2000 according to the present disclosure. Hardware and software may be combined to communicate through wired or wireless (IEEE 802.xx) with electric utility company (e.g., local electric utility grid 2118) for the purpose of demand response, grid sell-back, load-shed, and strike-price sell, thereby enabling both home/business owner/occupant and electric utility company the ability to remotely operate and control the system 2000 components. Sensor input data 2206 may be provided to the local electric company or grid 2118 and to processor 2130. Processor 2130 may provide a digital output 2142 (e.g., based on sensor input data 2206 or other information) to the local electric company or grid 2118 as well as to local electrical panel 2140 (e.g., to control actuation of transfer switch 2200). The processor 2130 may be an embedded or stand-alone microprocessor, microcontroller or PLC-based unit allowing a sequence of operations to be executed. Programming code may comprise executable logic instructions based on real-time input sensors, output commands, and algorithms which in-turn respond to but not limited to sensors, environment variables allowing the fluctuation of output processes through a real-time and/or hysteresis based algorithm. The blending module 2120 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

FIG. 19 is a diagram illustrating programming functions for the energy allocation system 2116. The functions may include a power on operation 2300, followed by a boot sequence 2302, and I/O system check 2304. The processor 2130 may then enter a native operation mode 2310 (e.g., set to initialize using power drawn from the local electric utility grid 2118), load various programming code 2312, receive input variables from various sensors 2314, and provide communication output 2316 to output physical terminals associated with other system 2000 devices.

Thus, the system 2000 and its processes are configured with a base function of producing air conditioning and generating power both together and separately. The generator 2112 provides backup power during power outages as well as supplemental power throughout the day. The blending module 2120 can split the generator head loads into AC and DC power allocations simultaneously, monitor rapid DC current fluctuations and compensate blending of solar and generator head power. The system 2000 produces generator 2112 power combined with photovoltaic or wind DC power to sustain the continuous operation of AC power for both on and off grid consumption. A predictive algorithm is used to standby KW pricing for utilities real time market value. System 2000 produces generator and blended power for the home/business electrical needs during local power outage, heavy loads, or time pricing. The system 2000 produces generator and photovoltaic power for home's/business' real-time needs while supplying excess generator/photovoltaic power to the electrical utility grid 2118.

In order to produce finite BTU (British Thermal Unit) attenuation, the air conditioning unit 2114 comprises a multi-speed condenser and fan setting controlled by preprogrammed software. This functionality lowers the systems 2000's overall power consumption by changing the condenser and fan's speed and frequency. The blended functionality air conditioning system connects through the blending module 2120 which ties to the local electric utility grid 2118. This configuration enables the generator 2112, along with the solar or DC energy source device 2110, the ability to sell power to the local electric utility grid 2118.

Programming code comprises instructions based on input sensors data, output commands, algorithms which in-turn respond to but not limited to sensors, environment variables allowing the fluctuation of output processes through a real-time and/or hysteresis based algorithm, logic, binary, compiled or precompiled language. The communication protocol for the blended functionality air conditioning system provides communication through wired or wireless (IEEE 802.xx) protocols.

As an example, in operation, system 2000 may initially operate air conditioning unit 2114 and/or other home/business electric devices via AC power drawn from the local electric utility grid 2118. As a source of DC power increases (e.g., a solar power increase as the day progresses), blending module 2120 may receive communications from solar energy device 2110 as to its power capability and begin reducing operation of such devices from grid 2118 AC power and increase operation using DC-based power (e.g., from solar energy device 2110). Blending module 2120 may cause DC voltage to air conditioning unit 2114 and convert the DC input from solar energy device 2210 to an AC output to power various home/business electrical devices 2122. Thus, as the availability of DC power increases, blending module 2120 may reduce power consumption from grid 2118. In the event of a local electric utility grid 2118 outage or disruption, transfer switch 2200 may be actuated, generator 2112 initiated, and air conditioning unit 2114 and/or local electric system 2122 may be powered by generator 2112 (e.g., 240 VAC fed directly to transfer switch 2200 and VDC power fed to air conditioner unit 2114). Further, DC power provided by solar energy device 2110 may be fed to air conditioning unit 2214 to reduce power reliance from generator 2112 and/or the local electric utility grid 2118, thereby resulting in reduced fuel consumption by generator 2112 (e.g., matching engine speed to current draw). For example, DC power from DC energy device 2110 may be fed into the power system 2116, and then the power system 2116 reduces or increases the speed of the generator 2112 based on the DC voltage and current of the DC energy device 2110. When grid 2118 power is restored, generator 2112 may be shut down, and power usage/regulation may be returned to normal.

FIG. 20 is a diagram illustrating an embodiment of a functional air conditioning unit 2500 employing the energy allocation system 2000 according to the present disclosure. Functional unit 2500 is configured to be a unitary, self-contained air conditioning device that, in some embodiments, is configured to function as and/or replace a standard home/business air conditioning unit (e.g., such as an A/C unit placed outside the home). For example, in the illustrated embodiment, 2500 includes an enclosure 2502 housing an air conditioning fan 2504, generator 2112, an AC/DC interactive grid rectifier 2506, a DC/AC interactive grid inverter 2508, a DC compressor 2510, a natural gas inlet 2512, a refrigerant inlet 2514, a refrigerant outlet (purge) 2516, and a refrigerant coil radiator 2518. Air conditioning unit 2500 may also include various components/circuitry associated with power system 2116 and/or blending module 2120 to facilitate power usage/delivery, monitoring and adjustment processes as described herein.

In the illustrated embodiment, unit 2500 consumes and provides power through existing utility lines of the home/business. Since generator 2112 is located inside of the enclosure 2502 or unit 2500, existing AC power line infrastructure may be used to supply AC power to the unit 2500. In the illustrated embodiment, unit 2500 includes an on-board, backup generator 2112 that may be powered using natural gas, propane or another type of fuel (e.g., via natural gas inlet 2512). Power system 2116 is connected to transfer switch 2200 to facilitate the supply of AC power to the local electrical system 2122 (e.g., in the event of a disruption of AC power from the local electric utility grid 2118 or otherwise).

Thus, embodiments of the present disclosure provide an air conditioning unit for producing air conditioning and generating power both together and separately. The generator 2112 provides backup power during power outages as well as supplemental power throughout the day. The blending module 2120 can split the generator head loads into AC and DC power allocations simultaneously, monitor rapid DC current fluctuations and compensate blending of DC and generator power. The system can produce generator power combined with photovoltaic, wind or another DC power to sustain the continuous operation of AC power for both on and off grid consumption.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures or corresponding description. For example, two blocks shown or described in succession may, in fact, be executed substantially concurrently, or the blocks/functions may sometimes be executed in the reverse order, depending upon the functionality involved. It will also be noted that each block of the block diagrams illustration, and combinations of blocks in the block diagrams illustration, can be implemented by special purpose hardware-based systems that perform the specified functions or acts, or combinations of special purpose hardware and computer instructions.

What is claimed is:

1. An energy allocation system, comprising:
   an air conditioning unit having:
   a DC-voltage compressor;
   a generator; and
   a voltage converter; and
   a blending module executable by a processor to:
   split AC power produced by the generator into AC and DC power allocations using the voltage converter;
   direct at least a portion of the DC power to the compressor; and
   responsive to a disruption to an AC power supply from a local electric utility grid, direct a first portion of the AC power generated by the generator to a local electrical system.

2. The system of claim 1, wherein the blending module is configured to combine power produced from an external DC energy device with the DC power produced via the AC power generated by the generator.

3. The system of claim 1, wherein the air conditioning unit further includes a fan configured for variable speed output, and wherein the blending module is configured to control the output speed of the fan.

4. The system of claim 1, wherein the blending module is configured to:
cause conversion of AC power received from a local electric utility grid into DC power; and
combine the DC power produced via the AC power received from the local electric utility grid with the DC power produced via the AC power generated by the generator.

5. The system of claim 2, wherein the blending module is configured to:
cause conversion of AC power received from a local electric utility grid into DC power; and
combine the DC power produced via the AC power received from the local electric utility grid with the DC power produced via the AC power generated by the generator and the DC power produced from the external DC energy device.

6. The system of claim 1, wherein the blending module is configured to direct at least a second portion of the AC power generated via the generator to a local electric utility grid.

7. The system of claim 1, wherein the blending module is configured to, independently of the AC power supply from the local electric utility grid, direct at least a portion of the AC power generated by the generator to a local electrical system.

8. The system of claim 1, wherein the blending module is configured to:
cause conversion of AC power received from a local electric utility grid into DC power; and
direct the DC power created from the local electric utility grid AC power to the compressor.

9. An energy allocation method, comprising:
providing an air conditioning unit having:
a DC-voltage compressor;
a generator; and
a voltage converter; and
providing a blending module executable by a processor to:
split AC power produced by the generator into AC and DC power allocations using the voltage converter;
direct at least a portion of the DC power to the compressor; and
responsive to a disruption to an AC power supply from a local electric utility grid, direct a first portion of the AC power generated by the generator to a local electrical system.

10. The method of claim 9, further comprising providing the blending module configured to combine power produced from an external DC energy device with the DC power produced via the AC power generated by the generator.

11. The method of claim 10, further comprising providing the blending module configured to:
cause conversion, via the voltage converter, of AC power received from a local electric utility grid into DC power; and
combine the DC power produced via the AC power received from the local electric utility grid with the DC power produced via the AC power generated by the generator and the DC power produced from the external DC energy device.

\* \* \* \* \*